(12) United States Patent
Yerrabommanahalli et al.

(10) Patent No.: US 10,694,364 B2
(45) Date of Patent: Jun. 23, 2020

(54) PROVIDING A LOCAL ADDRESS WHILE ROAMING

(71) Applicant: Apple Inc., Cupertino, CA (US)

(72) Inventors: Vikram B. Yerrabommanahalli, Sunnyvale, CA (US); Christopher A. Volkert, Santa Clara, CA (US); Krisztian Kiss, Hayward, CA (US); Prashant H. Vashi, Sunnyvale, CA (US); Rohan C. Malthankar, San Jose, CA (US); Yogesh D. Karandikar, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/830,369

(22) Filed: Dec. 4, 2017

(65) Prior Publication Data

US 2018/0279113 A1   Sep. 27, 2018

Related U.S. Application Data

(60) Provisional application No. 62/476,512, filed on Mar. 24, 2017.

(51) Int. Cl.
| | | |
|---|---|---|
| *H04W 8/02* | (2009.01) | |
| *H04L 12/741* | (2013.01) | |
| *H04W 4/02* | (2018.01) | |
| *H04W 48/18* | (2009.01) | |
| *H04W 84/12* | (2009.01) | |
| *H04W 8/12* | (2009.01) | |
| *H04W 8/08* | (2009.01) | |
| *H04W 40/20* | (2009.01) | |

(52) U.S. Cl.
CPC ............... *H04W 8/02* (2013.01); *H04L 45/74* (2013.01); *H04W 4/02* (2013.01); *H04W 48/18* (2013.01); *H04W 8/082* (2013.01); *H04W 8/12* (2013.01); *H04W 40/20* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 8,467,782 B1 * | 6/2013 | Faccin | H04L 65/1073 370/310 |
| 8,711,757 B2 | 4/2014 | Ophir et al. | |
| 9,408,071 B2 | 8/2016 | Sanyal et al. | |

(Continued)

*Primary Examiner* — Anh Vu H Ly
(74) *Attorney, Agent, or Firm* — Kowert, Hood, Munyon, Rankin & Goetzel, P.C.

(57) ABSTRACT

This disclosure relates to providing local address information while roaming. A wireless device may connect to a wireless local area network (WLAN) access point in a roaming location. The wireless device may communicate with one or more servers of a home network via the WLAN access point. The wireless device may provide a local address of the wireless device to the home network in one or more messages related to a service. The home network may be configured to determine a location of the wireless device based on the local address and determine whether to provide the service based on the location of the wireless device. In response to the home network determining to provide the service based on the location of the wireless device, the wireless device may perform the service using the home network via the WLAN access point.

18 Claims, 5 Drawing Sheets

(56) References Cited

U.S. PATENT DOCUMENTS

| | | | |
|---|---|---|---|
| 2013/0065585 A1* | 3/2013 | Pelletier | H04W 12/02 455/435.1 |
| 2014/0335791 A1* | 11/2014 | Kim | H04W 4/023 455/41.2 |
| 2015/0067819 A1* | 3/2015 | Shribman | H04L 67/06 726/12 |
| 2015/0257044 A1* | 9/2015 | Jiang | H04W 8/12 455/433 |
| 2016/0150574 A1* | 5/2016 | Edge | H04L 61/2564 455/404.2 |
| 2016/0255483 A1* | 9/2016 | Parlamas | H04W 4/90 455/404.2 |
| 2017/0005914 A1* | 1/2017 | Edge | H04W 4/90 370/328 |
| 2017/0134936 A1 | 5/2017 | Tan et al. | |
| 2018/0184277 A1* | 6/2018 | Suzuki | H04W 4/90 370/328 |
| 2018/0375903 A1* | 12/2018 | Mufti | H04L 65/1016 370/328 |

* cited by examiner

PROVIDING A LOCAL ADDRESS WHILE ROAMING

PRIORITY INFORMATION

This application claims benefit of priority of U.S. provisional application Ser. No. 62/476,512 titled "Providing a Local Address While Roaming" filed Mar. 24, 2017, which is hereby incorporated by reference in its entirety as though fully and completely set forth herein.

FIELD OF THE INVENTION

The present application relates to wireless communications, and more particularly to systems, apparatuses, and methods for providing a local address while roaming.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications.

To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY OF THE INVENTION

Embodiments are presented herein of apparatuses, systems, and methods for providing a local address while roaming.

In one embodiment, a wireless device or user equipment (UE) may wirelessly connect to a wireless local area network (WLAN) access point in a roaming location. The wireless device may communicate with one or more servers of a home network via the WLAN access point. The wireless device may provide a local address of the wireless device to the home network in one or more messages related to a service (e.g., a VoIP call, a SMS service, a data service such as one related to an application executing on the wireless device, etc.). The home network may be configured to determine a location of the wireless device based on the local address and to determine whether to provide the service based on the location of the wireless device. In response to the home network determining to provide the service based on the location of the wireless device, the wireless device may perform the service using the home network via the WLAN access point.

In some embodiments, a home network (e.g., one or more servers) of a user equipment device (UE) may receive local address information of the UE while the UE is located in a roaming area and is attached to a wireless local area network (WLAN) access point in the roaming area. For example, the local address information may be provided within requests (e.g., from the UE) related to a first service. The home network may determine a location of the UE based on the local address information. The home network may determine whether to provide one or more services (e.g., the first service) to the UE based on the location of the UE. Accordingly, the home network may provide an indication to the UE based on the result of the determination. The indication may indication provision or denial of the first service by the home network.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
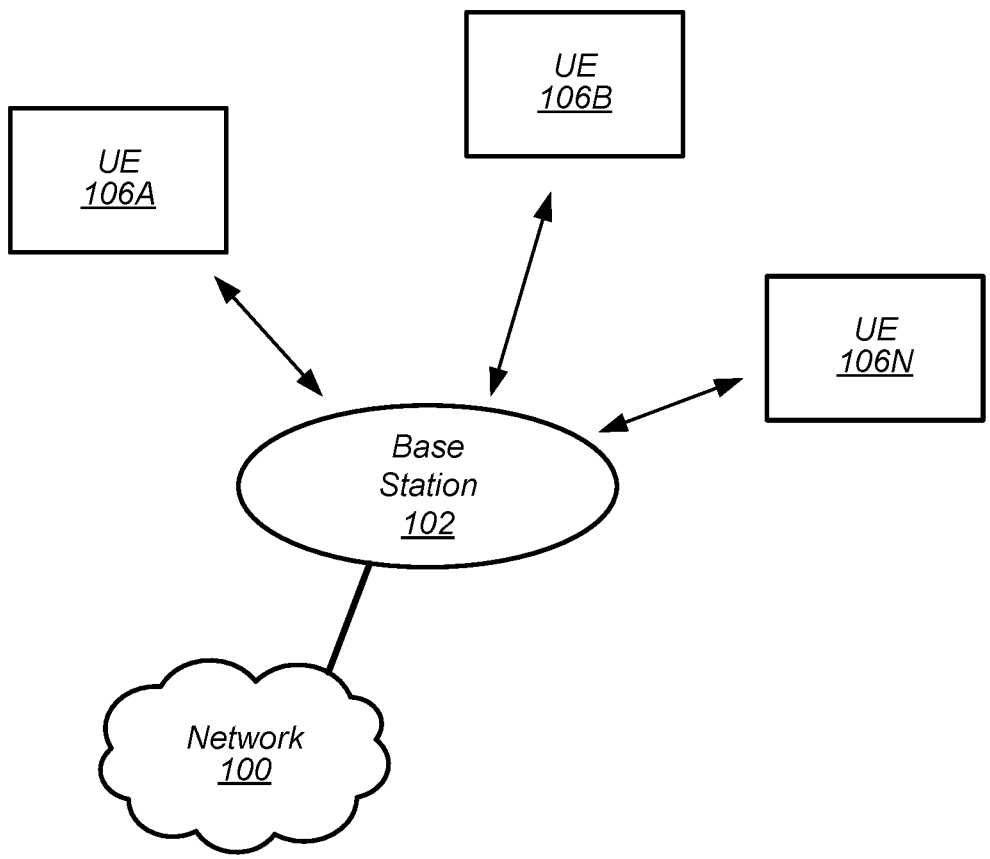
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:
UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
LAN: Local Area Network
WLAN: Wireless LAN
AP: Access Point
RAT: Radio Access Technology
IEEE: Institute of Electrical and Electronics Engineers
Wi-Fi: Wireless Local Area Network (WLAN) RAT based on the IEEE 802.11 standards

Terms

The following is a glossary of terms that may appear in the present application:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

FIG. 1—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities).

Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, WiMAX etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

Figure 2:
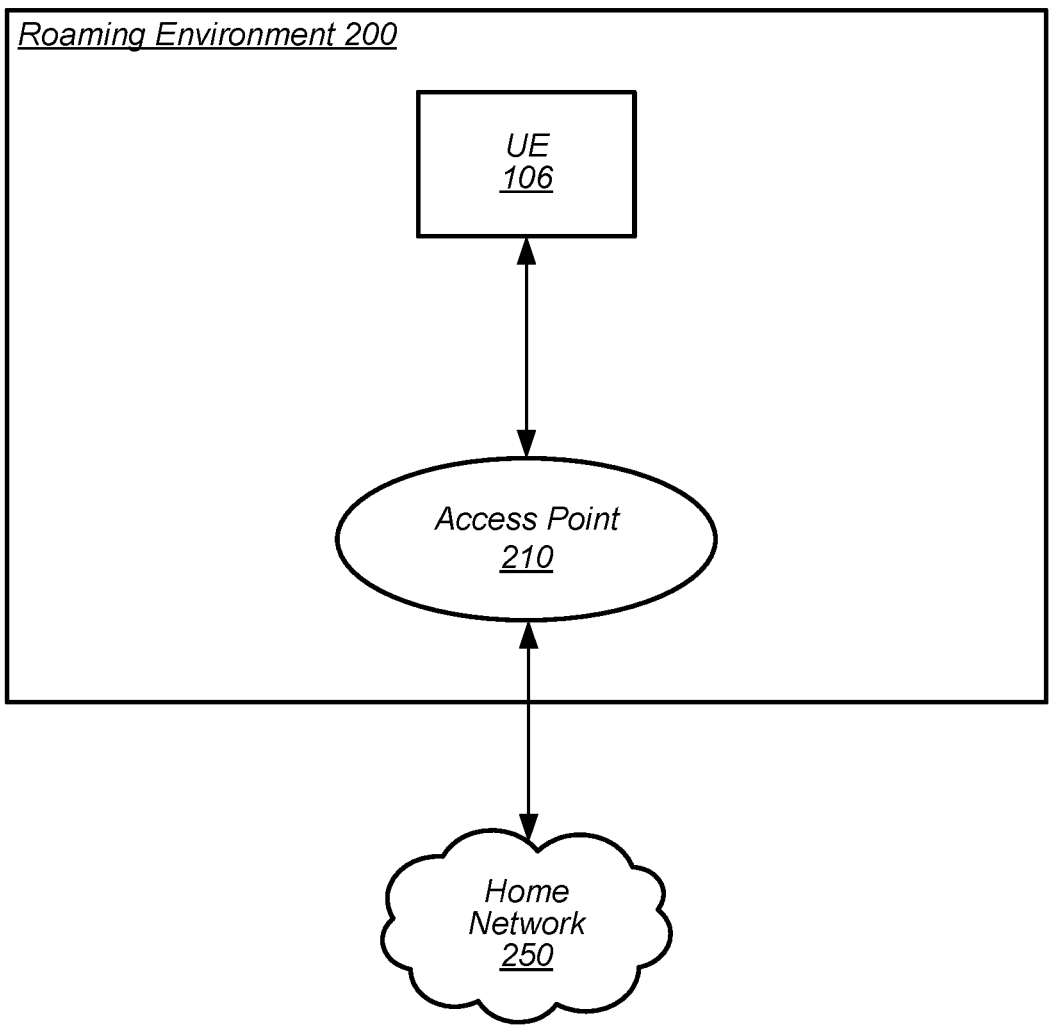
FIG. 2 illustrates an exemplary base station in communication with an exemplary wireless user equipment (UE) device, according to some embodiments.

FIG. 2—Exemplary Communication System while Roaming

FIG. 2 illustrates an exemplary (and simplified) wireless communication system in which aspects of this disclosure may be implemented, according to some embodiments. In particular, FIG. 2 illustrates an exemplary system in which the UE 106 may be attached or otherwise communicate with an access point 210 in a roaming environment 200. Additionally, the access point 210 may be in communication with home network 250 (e.g., similar to network 100, discussed above), which may be outside of the roaming environment 200.

For example, the roaming environment 200 may be a foreign country or area outside of the coverage by a service provider of the home network 250 for the UE 106, e.g., which may be located in the country or territory of the service provider of the UE 106, although other locations are also envisioned. Additionally, the access point 210 may be a WLAN access point, although other types of access points or base stations are envisioned. In one embodiment, the WLAN access point may be one that is "untrusted" by the home network 250. For example, the access point 210 may be one that is not operator-built, is not operated by the service provider or home network 250, or otherwise does not provide sufficient security, authentication, or encryption protocols to be considered "trusted". Further descriptions regarding trust and trust domains are provided below.

As a specific example, a user may have a subscription with a U.S. service provider and may travel to another country (an example roaming environment 200), outside of the service area of the service provider. The user may then join the UE 106 to a Wi-Fi network to perform various tasks involving data communication. In one embodiment, the user may wish to make a telephone call using Wi-Fi calling or use other services involving the home network 250. Accordingly, e.g., in response to a request from the UE 106, the access point 210 may communicate with the home network 250 (e.g., an evolved packet data gateway (ePDG) of a home public land mobile network (HPLMN)), which may be located outside of the roaming environment 200 (e.g., servers located in a service area of the service provider, such as in the U.S. in the present example). As discussed below, rather than requesting user input to authorize transmission of a location of the UE 106 in the foreign country, the UE 106 may be configured to provide a local address of the UE 106 to the home network 250, which may in turn use that information to determine a location (e.g., a country) of the UE. The home network 250 may then use this information in any of a variety of manners, e.g., it may fulfill specific regulatory or contractual obligations based on this location information, such as granting or denying service to the UE based on the specific country in which the UE 106 is located. Thus, the UE 106 may be configured to provide the local address instead of providing GPS or other location information (which may have required user authorization), which the home network 250 may use to determine the UE's location (e.g., country). This operation may also reduce UE battery consumption or time that would be required to determine the UE's precise location (e.g., lat long coordinate information).

Further details regarding providing the local address of the UE 106 are provided below.

Figure 3:
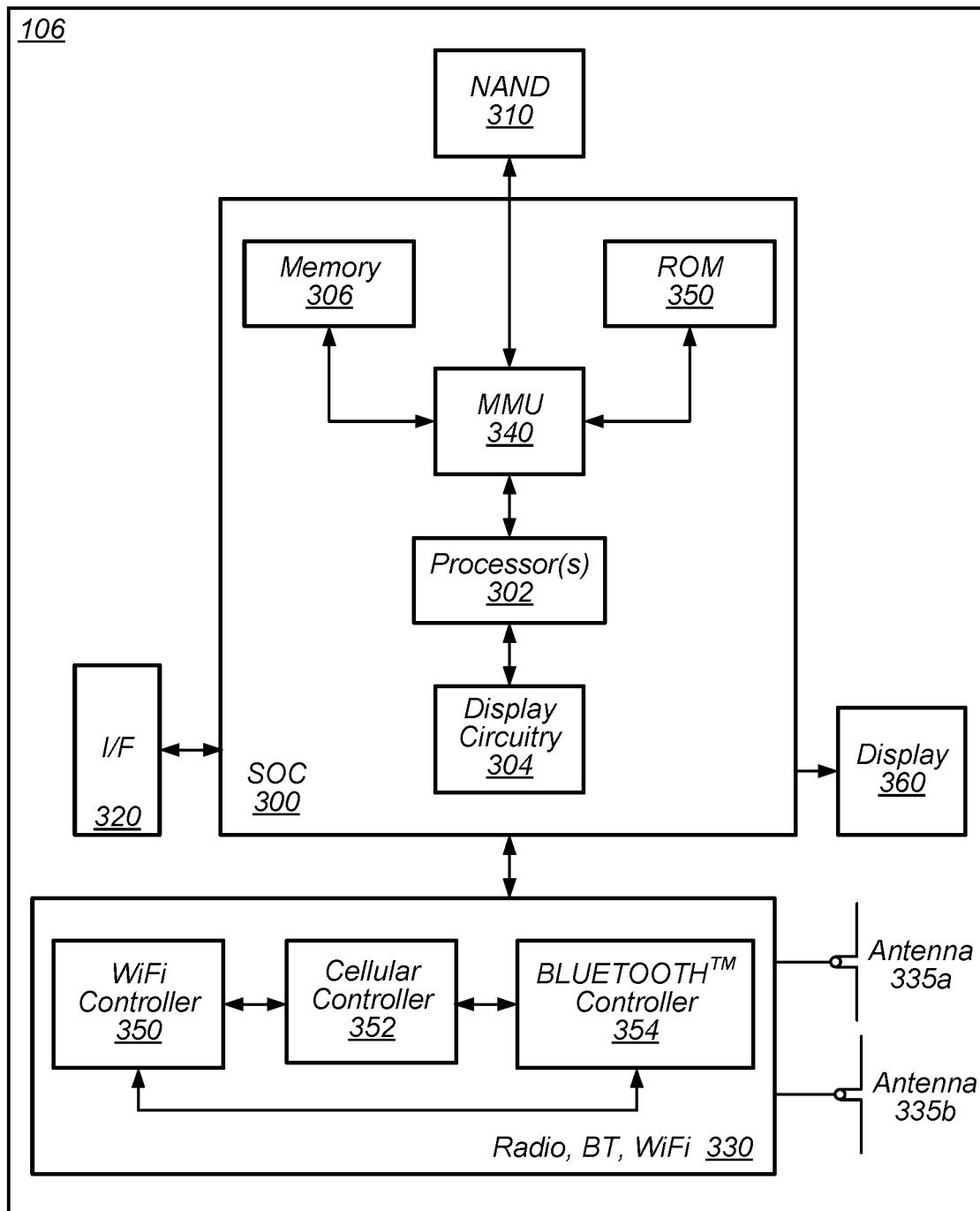
FIG. 3 illustrates an exemplary block diagram of a UE, according to some embodiments.

FIG. 3—Block Diagram of an Exemplary UE Device

FIG. 3 illustrates an exemplary block diagram of a user equipment 106 (e.g., one of the devices 106A through 106N), according to some embodiments. The UE 106 may be a device with wireless network connectivity such as a mobile phone, a hand-held device, a wearable device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or GSM), and separate radios for communicating using each of Wi-Fi and BLUETOOTH™. Other configurations are also possible.

In more detail, as shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

As described further subsequently herein, the UE 106 (and/or base station 102) may include hardware and software components for implementing methods for at least UE 106 to provide a local address of the UE 106. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform cellular communication using modular control channel formats for uplink control information according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 350, a cellular controller (e.g. NR controller) 352, and BLUETOOTH™ controller 354, and in at least some embodiments, one or more or all of these controllers may be implemented as respective integrated circuits (ICs or chips, for short) in communication with each other and with SOC 300 (and more specifically with processor(s) 302). For example, Wi-Fi controller 350 may communicate with cellular controller 352 over a cell-ISM link or WCI interface, and/or BLUETOOTH™ controller 354 may communicate with cellular controller 352 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 352 may, in addition to hardware and/or software components for performing cellular communication, include hardware and/or software components for performing Wi-Fi preamble detection, e.g., for detecting Wi-Fi physical layer preambles transmitted in unlicensed frequency bands that might be relevant to possible communication in unlicensed spectrum by the UE 106. As another possibility, the cellular controller 352 may include hardware and/or software components for generating Wi-Fi physical layer preamble signals, e.g., for transmitting as part of uplink communications by the UE 106 that occur in unlicensed frequency bands.

Figure 4:
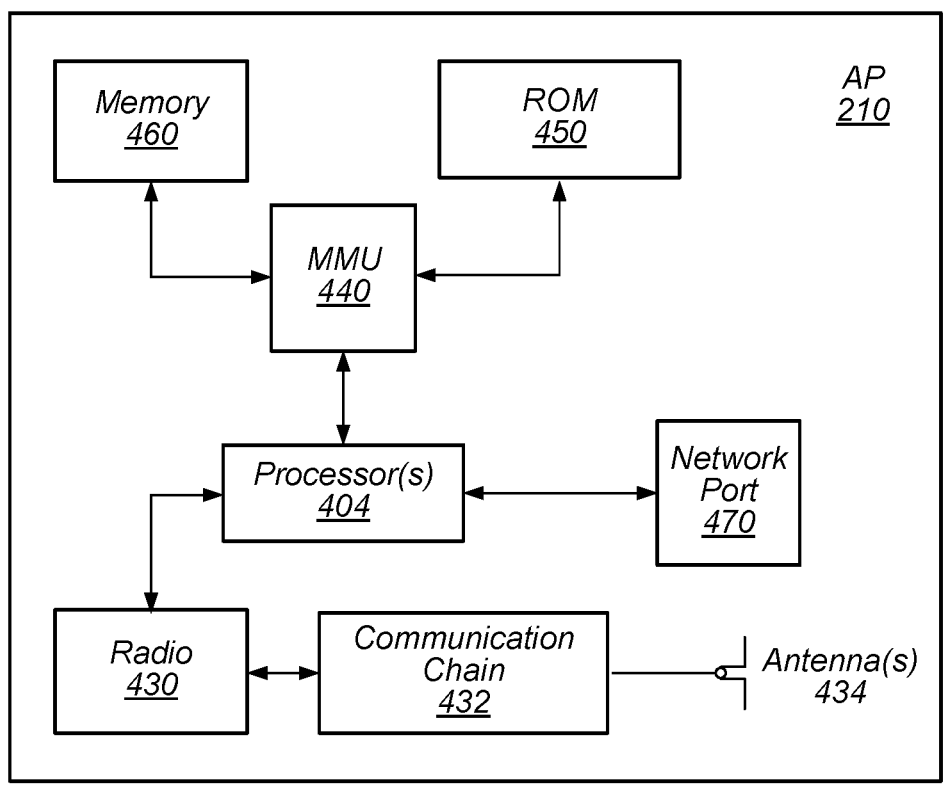
FIG. 4 illustrates an exemplary block diagram of a base station, according to some embodiments.

FIG. 4—Block Diagram of an Exemplary Base Station or Access Point

FIG. 4 illustrates a block diagram of an exemplary base station 102 (e.g., which may communicate according to various wireless communication standards) or access point 210 (e.g., which may communicate according to WLAN standards), according to some embodiments. It is noted that the system of FIG. 4 is merely one example of a possible base station or access point. For convenience the device is referred to as an access point below.

As shown, the access point 210 may include processor(s) 404 which may execute program instructions for the access point 210. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The access point 210 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The access point 210 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. When operating as a base station 102, the radio 430 may be designed to communicate via various wireless telecommunication standards, including, but not limited to, NR, LTE, LTE-A WCDMA, CDMA2000, etc. When operating as an access point 210, the radio 430 may be designed to communicate using various WLAN communication standards, among other possibilities. The processor 404 of the access point 210 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof.

In the case of certain RATs, for example WLAN or Wi-Fi, access point 210 may be designed as an access point (AP), in which case network port 470 may be implemented to provide access to a wide area network and/or local area network (s), e.g. it may include at least one Ethernet port, and radio 430 may be designed to communicate according to the WLAN standard.

Trust Domain

A trust domain can apply for specific header fields, telephone URI parameters, and/or SIP URI parameters within the IM CN (IP multimedia core network) subsystem.

For the IM CN subsystem, this trust domain may include the functional entities that belong to the same operator's network (e.g., the proxy call session control function (P-CSCF), the evolved P-CSCF (eP-CSCF), the emergency CSCF (E-CSCF), the interrogating CSCF (I-CSCF), the interconnection border control functions (IBCF), the serving CSCF (S-CSCF), the breakout gateway control function (BGCF), the media gateway control function (MGCF), the media resource function controller (MRFC), the media resource broker (MRB), the emergency access transfer function (EATF), the access transfer control function (ATCF), the IP multimedia subsystem (IMS) control (ISC) gateway function, and all application servers (ASs) that are included in the trust domain). Additionally, other nodes within the IM CN subsystem that are not part of the same operator's domain may or may not be part of the trust domain, depending on whether an interconnect agreement exists with the remote network. Session initiation protocol (SIP) functional entities that belong to a network for which there is an interconnect agreement may also be part of the trust domain. ASs outside the operator's network may also belong to the trust domain if they have a trusted relationship with the home network. Note that whether any peer functional entity is regarded as part of the same operator's domain, and therefore part of the same trust domain, may be dependent on operator policy which is preconfigured into each functional entity. Note further that the public safety answering point (PSAP) may be typically regarded as being within the trust domain. In some embodiments, national regulator policy applicable to emergency services may determine the trust domain applicable to certain header fields, e.g., the handling of the P-Access-Network-Info header field, P-Asserted-Identity header field and the History-Info header field can be as if the PSAP is within the trust domain, and trust domain issues may be resolved accordingly.

The trust domain can exist for a number of purposes: a) for the protection of information specific to an operator; b) to provide for privacy requirements of the end user; and/or c) to ensure that information is only passed to another entity if certain responsibilities related to that information are met by the receiving entity, for example that the signaled requirements in the Privacy header field will be met.

Within the IM CN subsystem, trust domains may be applied to a number of header fields. These trust domains do not necessarily contain the same functional entities or cover the same operator domains. Where the IM CN subsystem supports business communication, different trust domains can apply to public network traffic and to private network traffic belonging to each supported corporate network. Where an external attached network (e.g. an enterprise network) is in use, the edges of the trust domains may not necessarily lie at the P-CSCF.

A trust domain may apply to the following header fields: P-Asserted-Identity, P-Access-Network-Info, History-Info, Resource-Priority, P-Asserted-Service, Reason (only in a response), P-Profile-Key, P-Private-Network-Indication, P-Served-User, P-Early-Media, Feature-Caps Restoration-Info, Relayed-Charge, Service-Interact-Info, Cellular-Network-Info, Response-Source and Routable-Local-Address. A trust domain may apply for the purpose of the CPC and originating line information (OLI) telephone universal resource information (URI) parameters. A trust domain may apply for the inter-operator traffic leg (iotl) SIP URI parameter. The trust domains of these header fields and parameters may not have the same boundaries.

Routable Local Address Header Field

The Routable-Local-Address header field may be used to carry the UE's routable address at the local interface to the home service provider. This information can be used to deduce information about the user's location.

The Routable-Local-Address header field may be applicable within a trust domain. The Routable-Local-Address header field can be included in any SIP requests and responses, e.g., in which the P-Access-Network-Info header field is present.

The Routable-Local-Address header field may be populated by the UE with its routable IP address at the local interface and it may be forwarded to the home service provider (e.g., the home network).

The Routable-Local-Address header field may include sensitive information. Accordingly, in some embodiments, the Routable-Local-Address header field may always be removed when sent outside the trust domain, although there are possibilities where the removal is optional and/or based on various conditions. Thus, a functional entity at the boundary of the trust domain may remove the Routable-Local-Address header field received from the UE. Additionally, if a request is received from an untrusted entity that contains the Routable-Local-Address header field, the functional entity may remove Routable-Local-Address header field before forwarding the request within the trust domain.

A user agent (UA) that supports this extension and is willing to disclose this information may insert the Routable-Local-Address header field in any SIP request or response in which the P-Access-Network-Info header field is allowed to be present.

A SIP proxy may not modify the value of the Routable-Local-Address header field.

A SIP proxy may remove the Routable-Local-Address header field when the SIP signaling is forwarded to a SIP server located in an untrusted administrative network domain.

A receiving UE may not receive the Routable-Local-Address header field.

The syntax for Routable-Local-Address header field may be specified as follows:

Routable-Local-Address="Routable-Local-Address" HCOLON address/ext-type; address=IPv4address/ IPv6reference; ext-type=token; IPv4address=1*3DIGIT "." 1*3DIGIT "." 1*3DIGIT "." 1*3DIGIT; IPv6reference="[" IPv6address "]"; IPv6address=hexpart [":" IPv4address]; hexpart=hexseq/hexseq "::" [hexseq]/"::" [hexseq]; hexseq=hex4*(":" hex4); hex4=1*4HEXDIG.

When the UE is: 1) using the Evolved Packet Core (EPC) via Untrusted Wireless Local Access Network (WLAN) as IP-CAN to access the IM CN subsystem and 2) is attached to an ePDG in the HPLMN, it may include the Routable-Local-Address header field, if the information is available, in request(s) or response(s) (e.g., every request or response) in which the P-Access-Network-Info header field is present, among other situations.

Figure 5:
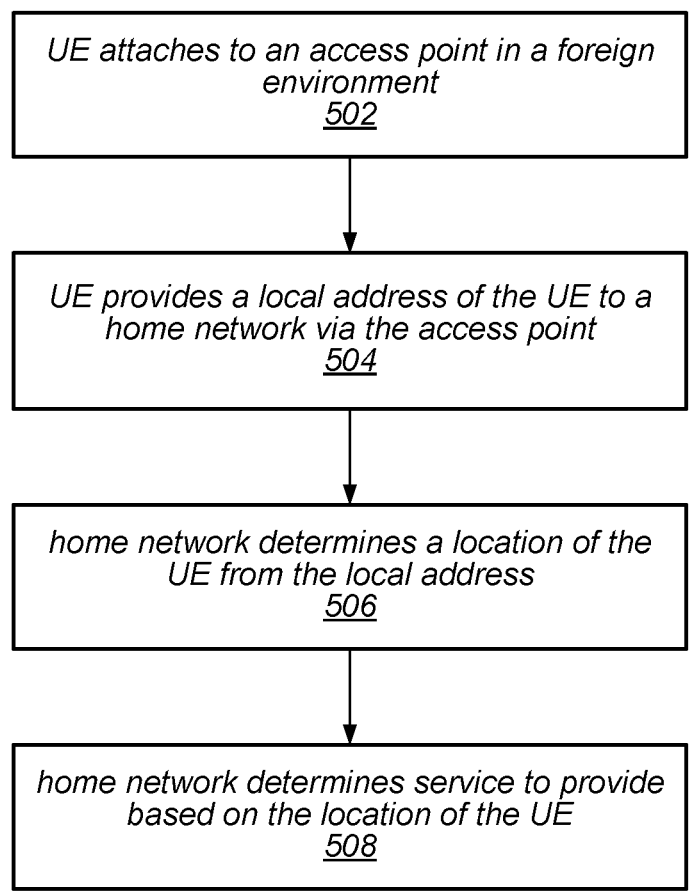
FIG. 5 is a communication flow diagram illustrating an exemplary method for providing a local address while roaming, according to some embodiments.

FIG. 5—Providing a Local Address while Roaming

FIG. 5 is a flowchart diagram illustrating a method for a wireless device (e.g., the UE 106) to provide a local address while roaming, according to some embodiments. Aspects of the method of FIG. 5 may be implemented by a wireless device, an access point, and/or a home network, such as a UE 106, the AP 210, and/or the home network 250 illustrated in and described with respect to various of the Figures herein, or more generally in conjunction with any of the computer systems or devices shown in the above Figures, among other devices, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

In 502, the UE may attach or otherwise wirelessly connect to an access point in a roaming environment or roaming location. The roaming environment or roaming location may be a foreign country or any area where the UE is outside of the service area of its home network or service provider. Additionally, as noted above, the access point may be a WLAN access point, although other types of access points are also envisioned. The access point may also provide the UE access to a home network of the UE, e.g., over the Internet. For example, the UE may be configured to communicate with an ePDG of the UE's HPLMN via the access point. In one embodiment, the UE may perform IMS registration with the home network via the access point. In some embodiments, the WLAN access point may be an "untrusted" access point that is not part of the home network's trusted domain. As a result, the home network may not be aware of the location of the WLAN access point and thus may not be aware of the UE's location.

Accordingly, in 504, the UE may provide local address information of the UE to the home network (e.g., the PDG of the HPLMN). For example, the UE may have a routable local address which can be used to communicate with the UE via the access point and may provide that routable local address in one or more messages to the home network. The UE may discover its routable local address in a variety of manners. In one embodiment, the UE may use a STUN protocol, e.g., as described in RFC 5245 section 2.1. For example, the server reflexive address returned by STUN may be used as the local address information, e.g., used to populate the Routable-Local-Address header. The UE may also be able to obtain or discover the routable local address in other ways, e.g., such as via notifications or requests from the access point.

In one embodiment, the UE may provide the local address information within a header field of one or more or a plurality of messages between the UE and the home network. For example, the UE may provide the local address in a header field (e.g., a P-Access-Network header field) of one or more SIP messages between the UE and the home network (e.g., P-CSCF or S-CSCF of the home network). In one embodiment, the UE may provide the local address in SIP messages (e.g., every SIP message), e.g., that include a P-Access-Network header field, among other possibilities.

In some embodiments, the UE may initiate or receive a voice over IP call (e.g., a WLAN or Wi-Fi call when connected to WLAN access point). The home network may be required to determine the location of the UE prior to providing or supporting the VoIP call via the access point (e.g., for regulatory or contractual purposes). However, the UE may be unable to provide the specific location of the UE directly without receiving explicit user input providing permission to provide that specific location. For example, the UE may not be allowed to obtain specific location information (e.g., GPS information from GPS circuitry) without explicit user input. Rather than requesting that input in a non-user friendly manner (e.g., a pop up message at every Wi-Fi call), the UE may be configured to provide the local address information, from which a general location of the UE (e.g., the country where the UE is located) can be inferred. Additionally, by avoiding determining the specific location of the UE, the UE may save processing time and/or battery consumption by providing the local address information instead. Note that while the specific example of a Wi-Fi call is given, the services provided by the home network may be any of a variety of services, e.g., video calls, data communication for various applications, SMS, etc. Thus, in some embodiments, the local address information may be provided in one or more messages related to requesting a particular service.

Thus, in 506, the home network may receive the local address information and may determine a location of the UE from the local address information. For example, the home network may use a look-up table of address information and locations to determine a country where the UE is located. The home network may further be configured to determine the location with more precision, e.g., a county, city, area, block, or address, depending on the precision and accuracy of the look-up process.

In 508, the home network may determine one or more services to provide to the UE based on the location of the UE determined in 506. For example, as noted above, the home network may be configured to deny some or all services to the UE in specific areas (e.g., restricted areas) based on regulatory or contractual obligations. In some embodiments, the area may be as large as a country, but in others, the area may be smaller sized, such as cities, or zones within a city, depending on the obligations of the home network.

Thus, where the services are allowed based on the location of the UE, the home network may provide those services upon determining the location is allowed. For example, the home network may allow the Wi-Fi call between the UE and another UE. In contrast, where they are not allowed based on the location of the UE, the home network may deny any requests or responses for that service.

Note that the acceptance or denial may be for all services or may be service specific. For example, certain services may be allowed in an area (e.g., texting or SMS) whereas others may not (e.g., VoIP calls). Services may include VoIP calls, WiFi calls, SMS, texting (e.g., IP texting), instant messages, data communication, data communication related to an application executing on the UE, etc. Thus, 508 may depend on the specific type of service or request from the UE as well as the location of the UE, and not just the location of the UE.

Thus according to one embodiment of FIG. 5, a UE may request a service and include local address information in the service request, and the home network may determine whether to provide or deny the service based on the location of the UE, determined from the local address information.

Exemplary Embodiments

In the following further exemplary embodiments are provided.

One set of embodiments may include a method, comprising, by a wireless device: coupling to a wireless local area network (WLAN) access point in a roaming location; communicating with one or more servers of a home network via the WLAN access point; providing a local address of the wireless device to the home network in one or more messages related to a service, wherein the home network is configured to determine a location of the wireless device based on the local address and to determine whether to provide the service based on the location of the wireless device; and in response to the home network determining to provide the service based on the location of the wireless device, performing the service using the home network via the WLAN access point.

In some embodiments, the WLAN access point is an untrusted WLAN access point.

In some embodiments, the service comprises a Wi-Fi call.

In some embodiments, the service comprises a voice over IP call.

In some embodiments, the service comprises a SMS or texting service.

In some embodiments, the service comprises data communication for an application of the wireless device.

In some embodiments, providing the local address of the wireless device comprises providing the local address within a header of the one or more messages.

In some embodiments, the one or more messages comprise one or more SIP messages.

In some embodiments, providing the local address of the wireless device comprises providing the local address within a local address header of a plurality of SIP messages.

In some embodiments, providing the local address of the wireless device comprises providing the local address within a header of each SIP message having a P-Access-Network header field.

Another set of embodiments may include a method, comprising: by one or more servers of a home network of a user equipment device (UE): receiving local address information of a UE, wherein the UE is located in a roaming area and is attached to a wireless local area network (WLAN) access point; determining a location of the UE based on the local address information; determining whether to provide one or more services to the UE based on the location of the UE; providing an indication to the UE based on determining whether to provide the one or more services to the UE based on the location of the UE.

In some embodiments, the location address information is received within a header field of one or more messages received from the UE.

In some embodiments, the one or more messages comprise SIP messages.

In some embodiments, the location address information is received within a header field of a plurality of SIP messages.

In some embodiments, the location address information is provided within a header of each SIP message having a P-Access-Network header field.

In some embodiments, the local address information is provided within requests related to a first service, wherein determining whether to provide the one or more services to the UE based on the location of the UE is performed for the first service, and wherein the indication indicates provision or denial of the first service.

In some embodiments, the one or more services comprises: a voice over IP call; a WiFi call; a SMS; a text; an instant message; data communication; or data communication related to an application executing on the UE.

Another exemplary set of embodiments may include a wireless device, comprising: an antenna; a radio coupled to the antenna; and a processing element operably coupled to the radio, wherein the device is configured to implement any or all parts of the preceding examples.

A yet further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method, comprising:
by a wireless device:
wirelessly connecting to a wireless local area network (WLAN) access point while roaming from a home network;
communicating with one or more servers of the home network via the WLAN access point;
providing a local address of the wireless device to the home network in one or more messages related to a service, wherein the local address comprises a mutable internet protocol (IP) address of the wireless device, wherein a location of the wireless device is determined by the home network based on the local address, and wherein provision of the service to the wireless device by the home network is determined based on the location of the wireless device;
in response to the determination to provide the service based on the location of the wireless device, performing the service using the home network via the WLAN access point;
wherein said providing the local address of the wireless device comprises providing the local address within a routable local address header field of the one or more messages.

2. The method of claim 1, wherein the service comprises a voice over IP call.

3. The method of claim 1, wherein the service comprises a short message service (SMS) or texting service.

4. The method of claim 1, wherein the service comprises data communication for an application of the wireless device.

5. The method of claim 1, wherein the one or more messages comprise one or more session initiation protocol (SIP) messages.

6. The method of claim 1, wherein said providing the local address of the wireless device comprises providing the local address within a header of each session initiation protocol (SIP) message having a P-Access-Network header field.

7. An apparatus for configuration within a wireless device, comprising:
one or more processors, wherein the one or more processors are configured to:
wirelessly connect to a wireless local area network (WLAN) access point in a roaming location;
communicate with one or more servers of a home network via the WLAN access point;
provide a local address of the wireless device to the home network in at least a header of one or more messages related to a service, wherein the local address comprises a routable internet protocol (IP) address of the wireless device, wherein a location of the wireless device is determined by the home network based on the local address, and wherein provision of the service to the wireless device by the home network is determined based on the location of the wireless device;
in response to the determination to provide the service based on the location of the wireless device, perform the service using the home network via the WLAN access point;

wherein said providing the local address of the wireless device comprises providing the local address within a routable local address header field of the one or more messages.

8. The apparatus of claim 7, wherein the WLAN access point is an untrusted WLAN access point.

9. The apparatus of claim 7, wherein the service comprises a voice over IP call.

10. The apparatus of claim 7, wherein the service comprises a short message service (SMS) or texting service.

11. The apparatus of claim 7, wherein said providing the local address of the wireless device comprises providing the local address within a routable local address header field of a plurality of session initiation protocol (SIP) messages.

12. The apparatus of claim 7, wherein said providing the local address of the wireless device comprises providing the local address within a header of each session initiation protocol (SIP) message having a P-Access-Network header field.

13. A method, comprising:
   by one or move servers of a home network of a user equipment device (UE):
      receiving local address information of the UE while the UE is roaming and is attached to a wireless local area network (WLAN) access point, wherein the local address information comprises a routable internet protocol (IP) address of the UE;
      determining a location of the UE based on the local address information;
      determining whether to provide one or more services to the UE based on the location of the UE;
      providing an indication to the UE based on said determining whether to provide the one or more services to the UE based on the location of the UE;
   wherein the location address information is received within a mutable local address header field of one or more messages related to a service received from the UE.

14. The method of claim 13, wherein the local address information is provided within requests related to a first service, wherein determining whether to provide the one or more services to the UE based on the location of the UE is performed for the first service, and wherein the indication indicates provision or denial of the first service.

15. The method of claim 13, wherein the one or more messages comprise SIP messages.

16. The method of claim 13, wherein the location address information is received within a header field of a plurality of session initiation protocol (SIP) messages.

17. The method of claim 13, wherein the location address information is provided within a header of each session initiation protocol (SIP) message having a P-Access-Network header field.

18. The method of claim 13, wherein the one or more services comprises:
   a voice over IP call;
   a short message service (SMS); or
   data communication related to an application executing on the UE.

* * * * *